(12) United States Patent
Yu et al.

(10) Patent No.: US 9,292,787 B2
(45) Date of Patent: Mar. 22, 2016

(54) COMPUTER-IMPLEMENTED DEEP TENSOR NEURAL NETWORK

(75) Inventors: Dong Yu, Bothell, WA (US); Li Deng, Redmond, WA (US); Frank Seide, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 13/597,268

(22) Filed: Aug. 29, 2012

(65) Prior Publication Data
US 2014/0067735 A1  Mar. 6, 2014

(51) Int. Cl.
*G06N 3/02* (2006.01)
*G06F 15/18* (2006.01)
*G06N 3/04* (2006.01)

(52) U.S. Cl.
CPC ... *G06N 3/02* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 4,918,618 A * | 4/1990 | Tomlinson, Jr. | 706/25 |
| 2009/0210218 A1 | 8/2009 | Collobert et al. | |
| 2011/0191274 A1 | 8/2011 | Yu et al. | |
| 2012/0065976 A1 | 3/2012 | Deng et al. | |
| 2012/0072215 A1 | 3/2012 | Yu et al. | |
| 2012/0275690 A1 * | 11/2012 | Melvin et al. | 382/156 |
| 2013/0212052 A1 | 8/2013 | Yu et al. | |

FOREIGN PATENT DOCUMENTS

WO  93/00655 A1  1/1993

OTHER PUBLICATIONS

Bilinear, http://web.archive.org/web/20111122215413/http://en.wikipedia.org/wiki/Bilinear_interpolation , 2011, pp. 6.*

Jaitly, et al., "Application of Pretrained Deep Neural Networks to Large Vocabulary Conversational Speech Recognition", Retrieved at <<http://www.cs.toronto.edu/~ndjaitly/techrep.pdf>>  Mar. 12, 2012, pp. 1-11.

Yu, et al., "Accelerated Parallelizable Neural Network Learning Algorithm for Speech Recognition", Retrieved at <<http://research.microsoft.com/pubs/152134/singlelayer4asr-interspeech2011-pub.pdf>> Interspeech '11, Aug. 28, 2011, pp. 2281-2284.

(Continued)

*Primary Examiner* — Li-Wu Chang
(74) *Attorney, Agent, or Firm* — Alin Corie; Sandy Swain; Micky Minhas

(57) ABSTRACT

A deep tensor neural network (DTNN) is described herein, wherein the DTNN is suitable for employment in a computer-implemented recognition/classification system. Hidden layers in the DTNN comprise at least one projection layer, which includes a first subspace of hidden units and a second subspace of hidden units. The first subspace of hidden units receives a first nonlinear projection of input data to a projection layer and generates the first set of output data based at least in part thereon, and the second subspace of hidden units receives a second nonlinear projection of the input data to the projection layer and generates the second set of output data based at least in part thereon. A tensor layer, which can converted into a conventional layer of a DNN, generates the third set of output data based upon the first set of output data and the second set of output data.

20 Claims, 7 Drawing Sheets

(56) References Cited

OTHER PUBLICATIONS

Yu, et al., "Deep Convex Net: A Scalable Architecture for Speech Pattern Classification", Retrieved at <<http://research.microsoft.com/pubs/152133/DeepConvexNetwork-Interspeech2011-pub.pdf>> Interspeech '11, Aug. 28, 2011, pp. 2285-2288.

Yu, et al., "Improved Bottleneck Features Using Pretrained Deep Neural Networks", Retrieved at <<http://research.microsoft.com/pubs/153642/bottleneck-interspeech2011-pub.pdf>> Interspeech '11, Aug. 28, 2011, pp. 237-240.

Min, et al., "A Deep Non-Linear Feature Mapping for Large-Margin kNN Classification", Retrieved at << http://www.cs.toronto.edu/~cuty/icdm09.pdf>> ICDM '09, Dec. 6, 2009, pp. 357-366.

Collobert, et al., "A Unified Architecture for Natural Language Processing: Deep Neural Networks with Multitask Learning", Retrieved at <<http://trac.assembla.com/chatbot_tesis/export/120/trunk/material/papers/unified_nlp.pdf>> ICML '08, Jul. 5, 2008, pp. 160-167.

Yu, et al, "Roles of Pre-Training and Fine-Tuning in Context-Dependent DBN-HMMs for Real-World Speech Recognition", Retrieved at <<http://research.microsoft.com/pubs/143619/dbn4asr-nips2010.pdf>> Proceedings: In NIPS Workshop on Deep Learning and Unsupervised Feature Learning, Dec. 2010, pp. 1-8.

Dahl, et al., "Context-Dependent Pre-trained Deep Neural Networks for Large Vocabulary Speech Recognition", Retrieved at <<http://research.microsoft.com/pubs/144412/dbn4lvcsr-transaslp.pdf>> In the Proceedings of IEEE Transactions on Audio, Speech, and Language Processing, Special Issue on Deep Learning for Speech and Langauge Processing, Jan. 2012, pp. 1-13.

Seide, et al., "Conversational Speech Transcription Using Context-Dependent Deep Neural Network", Retrieved at <<http://research.microsoft.com/pubs/153169/CD-DNN-HMM-SWB-Interspeech2011-Pub.pdf>> In the proceedings of in International Speech Communication Association, Aug. 2011, pp. 437-440.

Seide, et al., "Feature Engineering in Context-Dependent Deep Neural Networks for Conversational Speech Transcription", Retrieved at <<http://research.microsoft.com/pubs/157341/featureengineeringincd-dnn-asru2011-pub.pdf>> In the Proceedings of Workshop on Automatic Speech Recognition and Understanding, Dec. 11, 2011, pp. 24-29.

Renals, et al., "Connectionist Probability Estimators in HMM Speech Recognition", Retrieved at <<http://ieeexplore.ieee.org/iel4/89/6584/00260359.pdf?arnumber=260359>> In IEEE Transactions on Speech and Audio Processing, vol. 2, Issue 1, Jan. 1994, pp. 161-174.

Mohamed, et al., "Acoustic Modeling Using Deep Belief Networks", Retrieved at <<http://ieeexplore.ieee.org/stamp/stamp.jsp?tp=&arnumber=5704567>> In IEEE Transactions on Audio, Speech, and Language Processing, vol. 20, Issue 1, Jan. 2012, pp. 14-22.

Mohamed, et al., "Investigation of Full-Sequence Training of Deep Belief Networks for Speech Recognition", Retrieved at <<http://research.microsoft.com/pubs/135406/MMI-DBN-interspeech2010.pdf>> Sep. 2010, pp. 1992-1695.

Yu, et al., "Automated Directory Assistance System—from Theory to Practice", Retrieved at <<https://research.microsoft.com/pubs/75338/2007-yu-eurospeech.pdf>> In INTERSPEECH, Aug. 2007, pp. 2709-2711.

Memisevic, et al., "Gated Softmax Classication", Retrieved at <<http://www.csri.utoronto.ca/~hinton/absps/gatedsoftmax.pdf>> In the proceedings of in Advances in Neural Information Processing Systems, Dec. 2011, pp. 1-9.

Yu, et al., "Factorized Deep Neural Networks for Adaptive Speech Recognition", Retrieved at <<http://research.microsoft.com/pubs/162504/f-DNN.pdf>> Proceedings: International Workshop on Statistical Machine Learning for Speech Processing, Mar. 2012, pp. 1-5.

Yu, et al., "Exploiting Sparseness in Deep Neural Networks for Large Vocabulary Speech Recognition", Retrieved at <<http://research.microsoft.com/pubs/157584/DNN-Sparse-ICASSP2012.pdf>>, In Proceedings of ICASSP, Mar. 2012. pp. 1-4.

Hutchinson, et al., "A Deep Architecture with Bilinear Modeling of Hidden Representations: Applications to Phonetic Recognition", Retrieved at <<http://research.microsoft.com/pubs/157583/T-DSN-ICASSP2012.pdf>>, In Proceedings of ICASSP, Mar. 2012. pp. 1-4.

"International Search Report & Written Opinion for PCT Patent Application No. PCT/US2013/055898", Mailed Date: Feb. 10, 2014, Filed Date: Aug. 21, 2013, 11 Pages.

Kolda, et al., "Tensor Decompositions and Applications", In Sandia Report, Nov. 2007, pp. 1-71.

* cited by examiner

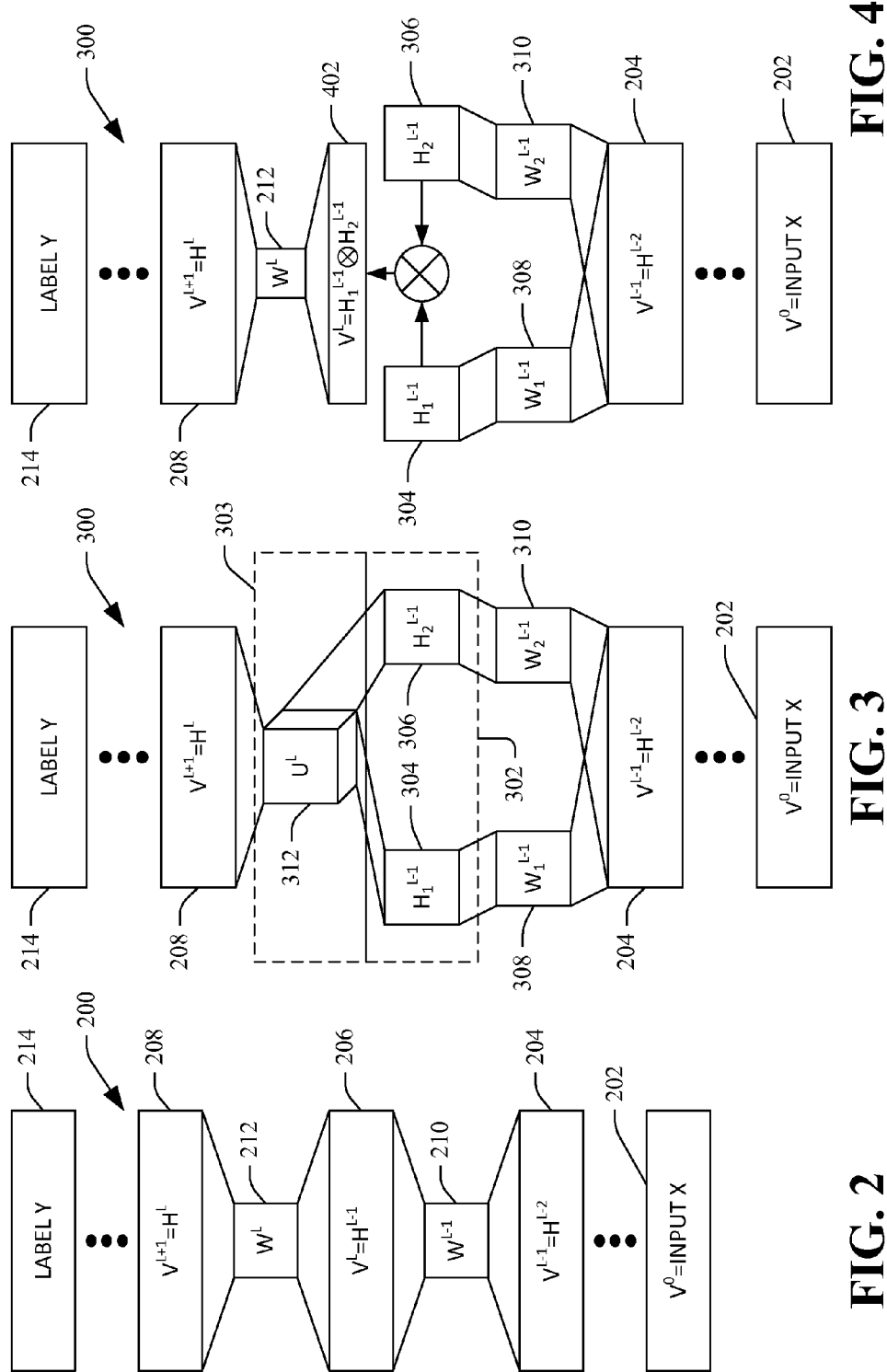

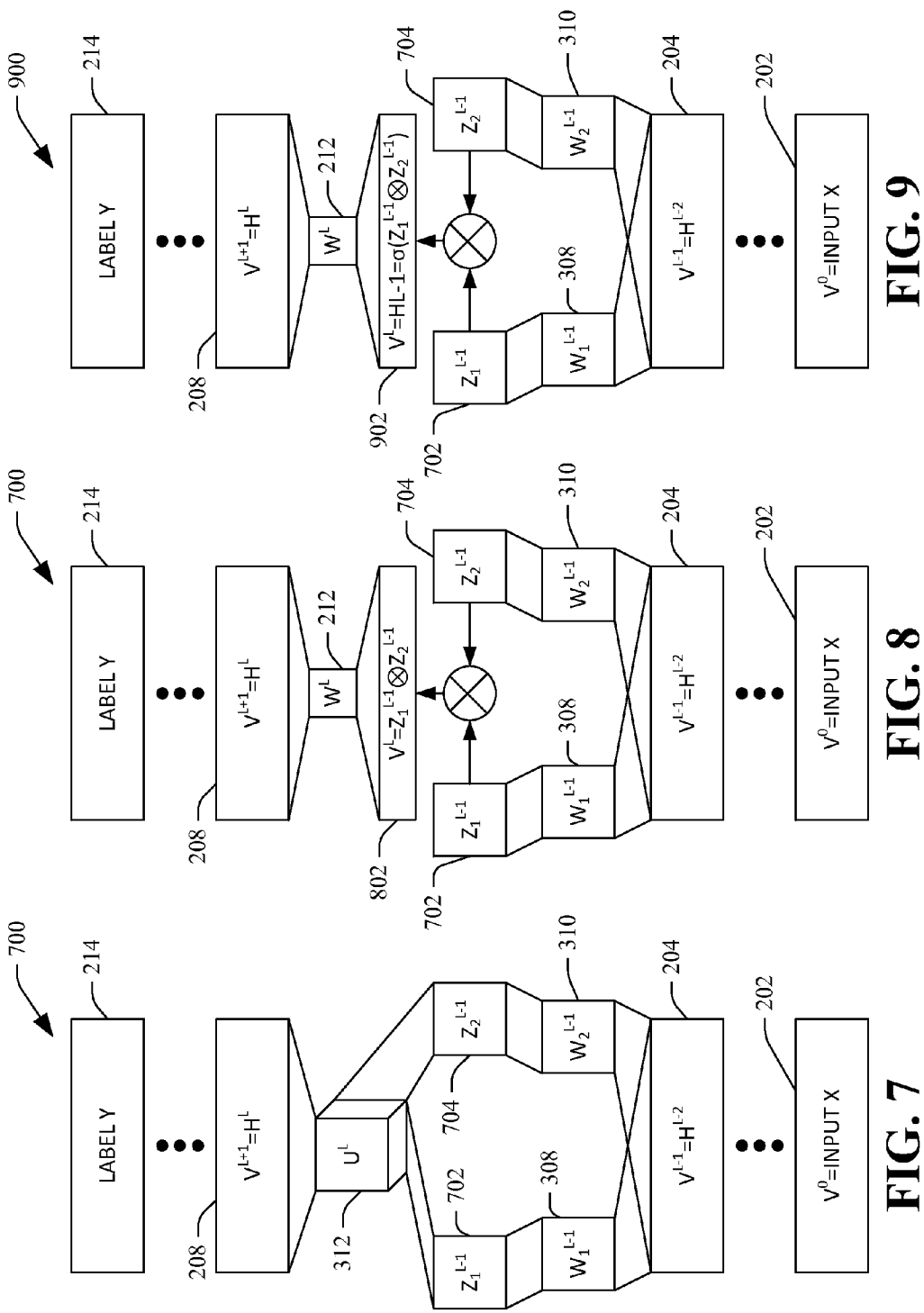

COMPUTER-IMPLEMENTED DEEP TENSOR NEURAL NETWORK

BACKGROUND

Many different types of computer-implemented recognition systems exist, wherein such recognition systems are configured to perform some form of classification with respect to input data. For example, computer-implemented speech recognition systems are configured to receive spoken utterances of a user and recognize words in the spoken utterances. In another example, handwriting recognition systems have been developed to receive a handwriting sample and identify, for instance, an author of the handwriting sample, individual letters in the handwriting sample, words in the handwriting sample, etc. In still yet another example, computer-implemented recognition systems have been developed to perform facial recognition, fingerprint recognition, and the like.

In many of these recognition systems, a respective recognition system is trained to recognize a relatively small number of potential labels. For instance, many speech recognition systems are trained to recognize words in a relatively small vocabulary (e.g., on the order of hundreds of words). Many conventional speech recognition systems that are configured to recognize words in a large vocabulary (on the order of thousands or tens of thousands of words) consume a significant amount of computer-readable memory, and additionally tend to require personalized training to accurately recognize words in spoken utterances. For many applications, however, it is impractical to obtain requisite training data to cause recognitions output by the recognition system to be sufficiently accurate. For instance, in a call-center scenario where words in a relatively large vocabulary are desirably recognized, it is impractical to train a speech recognition model for each individual customer, and is further impractical to ask each customer to devote several minutes to help train the speech recognition system.

Recently, deep neural networks have been studied as a potential technology that can robustly perform speech recognition without requiring a large amount of individualized training data. A deep neural network (DNN) is a deterministic model that includes an observed data layer and a plurality of hidden layers, stacked one on top of another. Each hidden layer includes a plurality of hidden units (neurons), which are coupled to other hidden units or an output label by way of weighted synapses. The output of a DNN is a probability distribution over potential labels corresponding to the input data. While DNNs have shown great promise in performing recognition tasks, improved robustness with respect to distortion, speaker identity, accent, and the like, is desired.

SUMMARY

The following is a brief summary of subject matter that is described in greater detail herein. This summary is not intended to be limiting as to the scope of the claims.

Described herein are various technologies pertaining to computer-implemented recognition systems. With more particularity, described herein are various technologies pertaining to deep tensor neural networks (DTNNs), which can be employed in various types of computer-implemented recognition systems, including but not limited to automatic speech recognition (ASR) systems, handwriting recognition systems, object character recognition (OCR) systems, facial recognition systems, fingerprint recognition systems, amongst others. A DTNN, as the term is used herein, is a deep neural network (DNN) that comprises a plurality of hidden layers, wherein the plurality of hidden layers comprise at least one projection layer and at least one tensor layer. A projection layer comprises multiple, potentially nonlinear projections of input data from another layer (another hidden layer or an observed data layer) that is (conceptually) beneath the projection layer in the DTNN. Specifically, the projection layer comprises at least two subspaces of hidden units, which receive respective projections of received input data from the another layer, and wherein such respective projections, in an exemplary embodiment, are nonlinear. The projections are generated via respective weighted matrices and mathematical functions (potentially nonlinear) at respective synapses that couple the projection layer with the another layer. In an exemplary embodiment, a nonlinear function can be the sigmoid function. In summary, then, the projection layer of the DTNN comprises at least two subspaces of hidden units, wherein the subspaces receive respective, potentially nonlinear, projections of input data received from an adjacent layer in the DTNN.

The tensor layer of the DTNN comprises a mathematical operation that effectively combines the projections in the projection layer and maps the resulting combination to a next adjacent layer in the DTNN, wherein such next adjacent layer can be another hidden layer (including a projection layer) or an output label layer. Thus, the tensor layer combines the projections in the subspaces to generate an output vector, which is subsequently provided to the adjacent layer in the DTNN. In an exemplary embodiment, the tensor layer can comprise a weight tensor. In another exemplary embodiment, the tensor layer can comprise a weight matrix that is formed to represent a tensor, thereby allowing tensor layers in the DTNN to be converted into conventional matrix layers without modifying an interface that describes the two different types of layers. More specifically, by causing a tensor to be represented as a matrix, weights of such matrix can be learned using conventional back-propagation techniques.

In another exemplary embodiment, a DTNN can comprise a plurality of projection layers and a respective plurality of tensor layers, wherein a number of projection layers is equivalent to a number of tensor layers. It is thus to be understood that any hidden layer in a deep neural network can be replaced by a combination of a projection layer and a tensor layer.

Other aspects will be appreciated upon reading and understanding the attached figures and description.

BRIEF DESCRIPTION OF THE DRAWINGS

FIG. 2 is a graphical representation of a conventional deep neural network (DNN).

FIG. 3 is an exemplary graphical representation of a DTNN, wherein the DTNN comprises a projection layer and a tensor layer.

FIG. 4 is an exemplary graphical representation of a DTNN, wherein a tensor layer includes a weight matrix.

FIG. 7 is a graphical representation of an exemplary DTNN, wherein a projection layer therein comprises linear projections of input data.

FIG. 8 is an alternative representation of the DTNN shown in FIG. 7.

FIG. 9 illustrates an exemplary representation of a quasi-DTNN.

DETAILED DESCRIPTION

Figure 1:
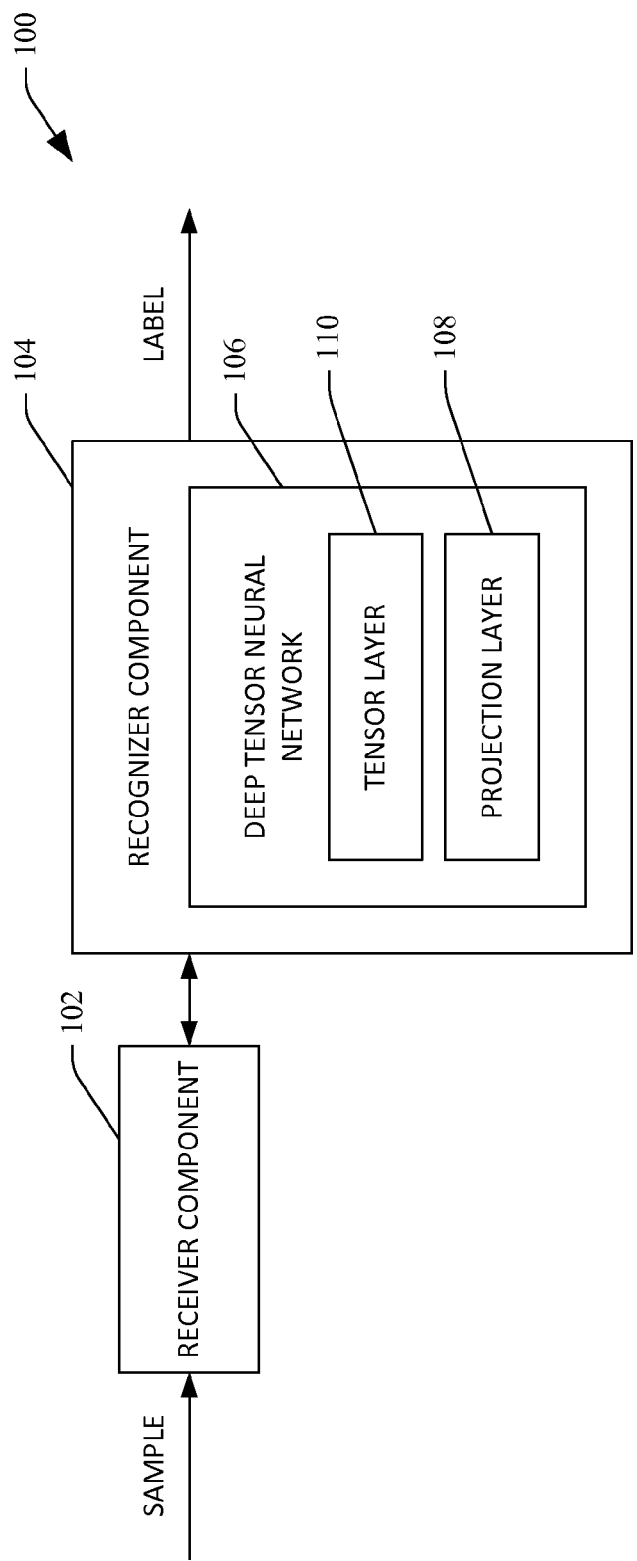
FIG. 1 is a functional block diagram of an exemplary recognition system that comprises a deep tensor neural network (DTNN).

Various technologies pertaining to computer-implemented recognition systems in general, and deep tensor neural networks (DTNNs) in particular, will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. The terms "component" and "system" are also intended to encompass hardware-only embodiments, such as a field-programmable gate array or portion thereof that is configured to perform certain functionality. Moreover, the terms "component" and "system" are intended to encompass system on chip (SoC) and cluster on chip (CoC) implementations of hardware that is configured to perform certain functionality. It is also to be understood that a component or system may be localized on a single device or distributed across several devices.

With reference now to FIG. 1, an exemplary system 100 that facilitates assigning a label to a sample set forth by a user is illustrated. In an exemplary embodiment, the system 100 can be a computer-implemented recognition system that is configured to perform a recognition/classification task with respect to received input samples. Accordingly, the system 100 can be configured to perform automatic speech recognition (ASR), facial recognition, object character recognition (OCR), handwriting recognition, fingerprint recognition, or other suitable recognition/classification task. Additionally, the system 100 can be configured to execute on a client computing device, can be configured to execute on a server, or can be configured to execute in a distributed manner across a client computing device and a server. Therefore, for example, the system 100 may be comprised by a mobile computing device, such as a mobile telephone, a tablet computing device, or the like.

The system 100 comprises a receiver component 102 that receives a sample from a user. The sample may be a spoken utterance, a document with handwriting therein, an image of a fingerprint, an image of a face, etc. The system 100 additionally comprises a recognizer component 104 that is in communication with the receiver component 102 and assigns at least one label to the sample received by the receiver component 102. For instance, the label can be indicative of a word recognized in a spoken utterance of the user. Therefore, for instance, the label can be a phone, a senone, or a word. Similarly, the label can be an identification of a letter or word in a handwriting sample, an identification of at least a partial match for fingerprint analysis, etc.

The recognizer component 104 assigns the label to the sample through utilization of a deep tensor neural network (DTNN) 106. As will be described in greater detail below, the DTNN 106 is a deep neural network (DNN), wherein at least one hidden layer therein is replaced by a combination of a projection layer and a tensor. With more specificity, the DTNN 106 comprises a plurality of hidden layers. For instance, the deep tensor neural network 106 can have between 1 hidden layer and 100 hidden layers, with a typical number of hidden layers between 5 and 9 for tasks such as speech recognition. Each hidden layer can have between 100 to 100,000 hidden units. As will be understood by one skilled in the art, DNNs include an observed data layer, a plurality of hidden layers, and a layer that includes potential labels. Conceptually, a DNN is a stacked network, wherein layers therein are stacked one on top of another. Furthermore, data travels unidirectionally through hidden layers in a DNN, such that a hidden layer in the DNN receives input data from an immediately adjacent layer in the DNN and outputs data to another immediately adjacent layer in the DNN. Therefore, for any hidden layer in a DNN, such hidden layer receives input data from one (and only one) adjacent layer (another hidden layer or the observed data layer) and outputs output data to one (and only one) other layer in the DNN. An exemplary representation of a structure of a DNN is shown in FIG. 2, and will be described below.

As mentioned above, the DTNN 106 comprises a plurality of hidden layers, wherein at least one of such hidden layers is a projection layer 108. The projection layer 108 comprises multiple subspaces, wherein each subspace comprises a respective plurality of hidden units, and wherein each hidden unit comprises a respective activation function. A hidden unit receives input data (by way of one or more weighted synapses from an adjacent hidden layer in the DTNN), executes its respective activation function over the input data, and generates output data based upon the execution of the respective activation function over the input data. The projection layer 108 receives input data from an adjacent layer, and generates multiple, potentially nonlinear projections of the input data for provision to the aforementioned subspaces. In an exemplary embodiment, a sigmoid function can be executed over respective projections of input data. Additionally, respective weight matrices with learned weights therein can be employed in connection with further modifying a projection prior to being provided to respective subspaces. For purposes of explanation, a projection layer as described herein comprises two subspaces that receive two respective projections; it is to be understood, however, that a projection layer can include more than two subspaces that receive respective, potentially nonlinear, projections of input data.

As can be ascertained, each subspace in the projection layer 108 generates output data, as hidden units therein execute activation functions over data received thereby. The recognizer component 104 additionally comprises a tensor layer 110, wherein the tensor layer 110 is immediately adjacent to the projection layer 108 in the DTNN 106. Generally, the tensor layer 110 receives respective output data from each subspace of hidden units in the projection layer 108 and combines the respective output data to generate vector output data that is mapped to another layer (e.g., another hidden layer) in the DTNN 106. For example, a layer that receives the vector output data from the tensor layer 110 may be another hidden layer, such as a projection layer, which will be shown below.

In the context of speech recognition, inclusion of projection layers and tensor layers in DNNs can be employed to factorize parameters of speech that can affect speech recognition, such as an identity of a speaker, distortion (background noise and channel distortion), and the like, wherein such parameters can be represented as interactions between subspaces of hidden units. Therefore, subspaces of hidden units in the projection layer 108 can be employed to represent hidden underlying factors that affect speech recognition. Furthermore, it is to be understood that the DTNN 106 can comprise a plurality of projection layers as well as a plurality of tensor layers, wherein the number of projection layers and the number of tensor layers in the DTNN 106 are equivalent.

Now turning to FIG. 2, a graphical representation of an exemplary conventional DNN 200 is illustrated. The DNN 200 comprises an observed data layer 202, which captures an input sample in the form of a vector $V^0$. The input is denoted in FIG. 2 by X, which is an I×1 vector. The DNN further comprises a plurality of hidden layers 204-208. Each of the hidden layers 204-208 comprises a respective plurality of hidden units, and wherein each hidden unit comprises a respective activation function. Hidden units in adjacent layers are potentially connected by way of weighted synapses, which can be collectively be represented by weight matrices 210 and 212 between hidden layers. As shown, the weight matrix 210 represents weighted synapses between hidden units in the hidden layer 204 (hidden layer $H^{L-2}$) and hidden units in the hidden layer 206 (hidden layer $H^{L-1}$). Similarly, the weight matrix 212 represents weighted synapses between hidden units in the hidden layer 206 and hidden units in the hidden layer 208 (hidden layer $H^L$). A layer 214 in the DNN 200 is the output, which is determined based upon the weighted synapses and activation functions of hidden units in the DNN 200. The output is denoted in FIG. 2 as Y.

With reference now to FIG. 3, a graphical representation of a DTNN 300 is illustrated. The DTNN 300 comprises the observed data layer 202, hidden layer 204, hidden layer 208, and the output layer 214. In the DTNN 300, a projection layer 302 and a tensor layer 303, replace the hidden layer 206. Specifically, the hidden layer 206 is separated into two subspaces 304 (subspace $H_1^{L-1}$) and 306 (subspace $H_2^{L-1}$), wherein the subspace 304 is a $K_1^{l-1} \times 1$ vector of hidden units and the subspace 306 is a $K_2^{l-1} \times 1$ vector of hidden units. The input data (data output by hidden units in the hidden layer 204) is projected to the subspaces 304 and 306, potentially nonlinearly, by respective sets of weighted synapses, which are represented by weight matrices 308 ($W_1^{L-1}$) and 310 ($W_2^{L-1}$), respectively. The weight matrices 308 and 310 can represent weights of synapses between hidden units in the hidden layer 204 and respective hidden units in the subspaces 304 and 306, as well as respective mathematical operations that are to be undertaken over the input data (data output by the hidden units in the hidden layer 204).

In the exemplary DTNN 300, the tensor layer 303 comprises a weight tensor 312 that, generally, combines output of the subspaces 304 and 306 of hidden units to generate an output vector, which is received by the hidden layer 208. As shown, the tensor 312 is denoted by $u^l$ of dimension $K_1^{l-1} \times K_2^{l-1} \times K^l$ according to the following algorithm:

$$h_{(k)}^l = \sigma(\Sigma_{i,j} u_{(i,j,k)}^l h_{1(i)}^{l-1} h_{2(j)}^{l-1} + a_{(k)}^l). \qquad (1)$$

where i,j,k are indexes of the hidden units in layers $h_1^{l-1}$, $h_2^{l-1}$ and $h^l$, respectively, $a^l$ is the bias, and $\sigma(x)=1/(1+\exp(-x))$ is the sigmoid function applied element-wise.

With reference now to FIG. 4, an alternate representation of the DTNN 300 is shown. The output $v_l$ (shown as 402 in FIG. 4) of the projection layer 302 can be defined as follows:

$$v^l = \text{vec}(h_1^{l-1} \otimes h_2^{l-1}) = \text{vec}(h_1^{l-1}(h_2^{l-1})^T), \qquad (2)$$

where $\otimes$ is Kronecker product and vec(·) is the column-vectorized representation of the matrix. When the output $v_l$ is represented in this form, the tensor 312 can be organized and rewritten into the weight matrix 212 ($w^l$). In other words, the following can be obtained:

$$h_{(k)}^l = \sigma(\Sigma_i w_{(i,k)}^l v_{(i)}^l + a_{(k)}^l) \qquad (3)$$

Such rewriting allows tensors in tensor layers to be converted into weight matrices, and further allows an interface to be defined that describes such two different types of layers. For example, in FIG. 4, the hidden layer 208 can be considered as a conventional layer, such as shown in FIG. 2, and weights of the weight matrix 212 can be learned using the conventional back-propagation algorithm. Additionally, such rewriting also indicates that the tensor layer 303 can be considered a conventional layer, whose input comprises first and second order statistics of the values passed from the previous layer. The projection layer 302, which comprises the first subspace 304 and the second subspace 306, however, remains, wherein the first subspace 304 and the second subspace 306 are determined based upon the separate weight matrices 308 and 310. While the DTNN 300 is shown in both FIG. 3 and FIG. 4 as including a single projection layer, it is to be understood that a DTNN can include several projection layers.

Figures 5, 6:
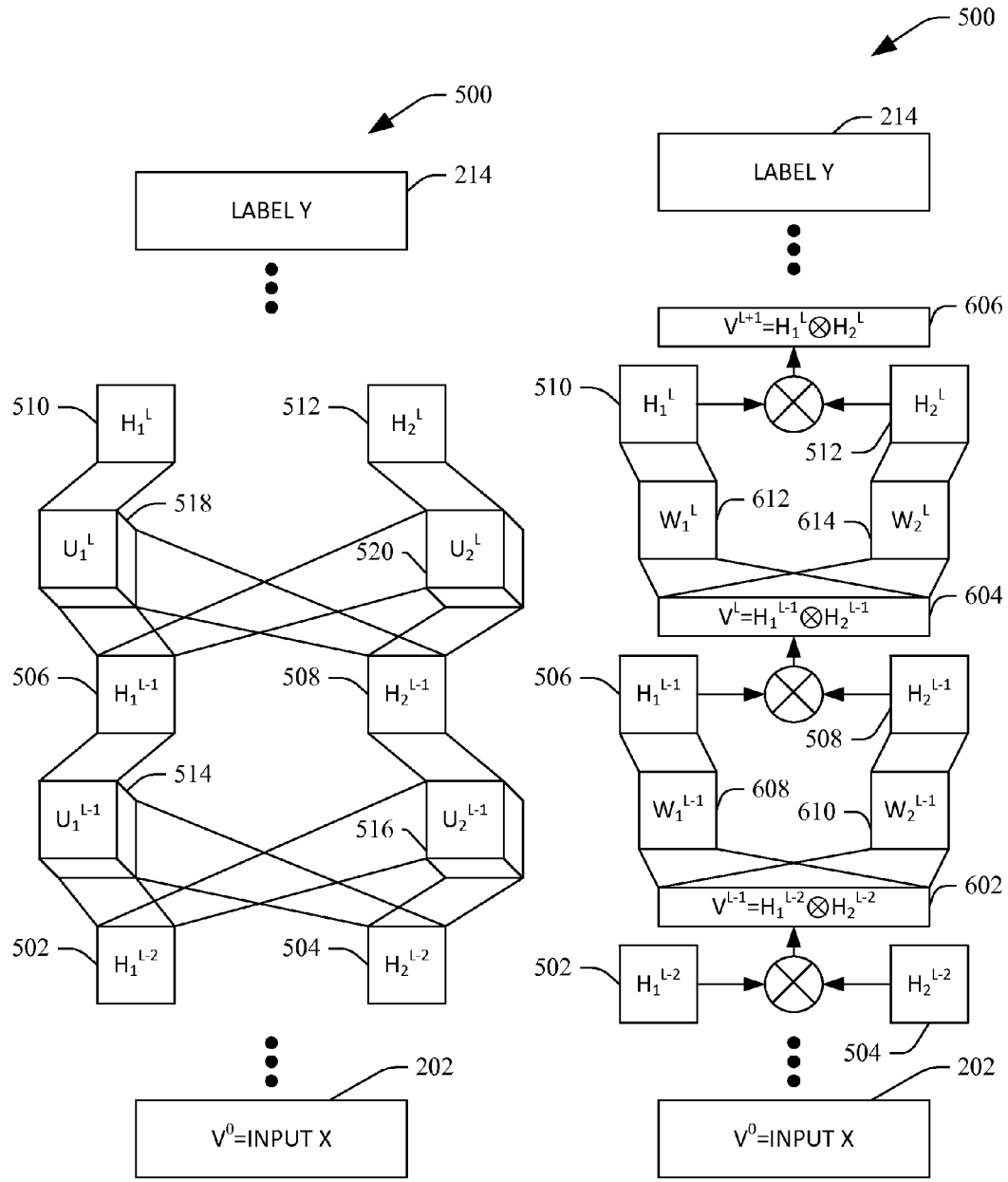
FIG. 5 is an exemplary graphical representation of a DTNN that comprises a plurality of projection layers and a corresponding plurality of tensor layers.
FIG. 6 is an alternative representation of the DTNN shown in FIG. 5.

Now referring to FIG. 5, an exemplary DTNN 500 that includes a plurality of hidden layers is illustrated, wherein each hidden layer is either a projection layer or a tensor layer. The DTNN 500 includes the observed data layer 202 and the output layer 214. The DTNN 500 comprises a projection layer l-2, which comprises subspaces 502 ($h_1^{l-2}$) and 504 ($h_2^{l-2}$), a projection layer l-1 that comprises subspaces 506 ($h_1^{l-1}$) and 508 ($h_2^{l-1}$), and a projection layer l that comprises subspaces 510 ($h_1^l$) and 512 ($h_2^l$), wherein l is an exemplary layer index. The DTNN 500 additionally comprises a tensor layer l-1 that comprises tensors 514 ($u_1^{l-1}$) and 516 ($u_2^{l-1}$), a tensor layer l that comprises tensors 518 ($u_1^l$) and 520 ($u_2^l$), and so on.

The outputs of the hidden units in the subspace 502 and the outputs of the hidden units in the subspace 504 are received at both of the tensors 514 and 516. The tensor 514 combines such outputs and generates a first output vector, which is provided to hidden units in the subspace 506. Similarly, the tensor 516 combines such outputs and generates a second output vector, which is provided to hidden units in the subspace 508. Likewise, the outputs of the hidden units in the subspace 506 and the outputs of the hidden units in the subspace 508 are received at both of the tensors 518 and 520. The tensor 518 combines such outputs and generates a third output vector, which is provided to hidden units in the subspace 510. Similarly, the tensor 520 combines such outputs and generates a fourth output vector, which is provided to hidden units in the subspace 512. It is to be noted that weights and/or mathematical operations corresponding to each of the tensors 514-520 can be different; therefore, although, for instance, the tensor 514 and the tensor 516 receive equivalent inputs, their respective outputs are non-identical.

It can be noted in the DTNN 500 that the input $v_l$ to each projection layer is projected onto two potentially nonlinear subspaces $h_1^l$ and $h_2^l$. The first and second order statistics of such projections can then be combined as the input feature to the adjacent higher layer as quantified by Eq. (2).

With reference now to FIG. 6, an alternative representation of the DTNN 500 is shown, Here, the output $v^{l-1}$ of hidden layer $h^{l-2}$ is defined as follows:

$$v^{l-1} = \text{vec}(h_1^{l-2} \otimes h_2^{l-2}) = \text{vec}(h_1^{l-2}(h_2^{l-2})^T). \quad (4)$$

This is shown collectively as reference numerals 602, 604, and 606 in FIG. 6. With such definition, the tensors 514 and 516 can be rewritten as weight matrices 608 ($w_1^{l-1}$) and 610 ($w_2^{l-1}$), respectively. Likewise, the tensors 518 and 520 can be rewritten as matrices 612 ($w_1^l$) and 614 ($w_2^l$), respectively. Therefore, the DTNN 500 as shown in FIG. 6 can be represented using two types of hidden layers; a conventional sigmoid layer and a projection layer. Each of these hidden layer types can be flexibly placed in a DTNN. For classification tasks, a softmax layer that connects a final hidden layer to labels can be used in the DTNN 500 similar as to how it would be employed in a conventional DNN.

Table 1, shown below, summarizes forward computations involved in a DTNN, where the input is always converted and written as $v_l$, a $K_v^l \times 1$ column vector, $w^l$ is the weight matrix, $a^l$ is the bias, $w_{y'}^l$ is a column vector of the weight matrix $w^l$, and $$z^l(v^l) = (w^l)^T v^l + a^l \quad (5)$$

is the activation vector given the input $v_l$.

TABLE 1

FORWARD COMPUTATIONS IN DTNNs.

| Condition | Input $v^1$ |
|---|---|
| first layer | $v^1 = v^0 = x$ |
| $h^{l-1}$: normal layer | $v^1 = h^{l-1}$ |
| $h^{l-1}$: projection layer | $v^1 = \text{vec}(h_1^{l-1} \otimes h_2^{l-1})$ |

| Condition | Output $h^1$ |
|---|---|
| normal layer | $h^l = \sigma(z^l(v^l)) = \sigma((w^l)^T v^l + a^l)$ |
| projection layer, $i \in \{1,2\}$ | $h_i^l = \sigma(z_i^l(v^l)) = \sigma((w_i^l)^T v^l + a_i^l)$ |
| softmax layer | $p(y \mid v^L) = \dfrac{\exp((w_y^L)^T v^L + a_y^L)}{\sum_{y'} \exp((w_{y'}^L)^T v^L + a_{y'}^L)}$ |

It can be noted that, for a projection layer, the output has two portions:

$$h_i^l = \sigma(z_i^l(v^l)) = \sigma((w_i^l)^T v^l + a_i^l), \quad (6)$$

where $i \in \{1,2\}$ indicates the portion number. Two hidden layer vectors $h_1^{l-1}$ and $h_2^{l-1}$ may be augmented with value 1's when generating the input $v_l$ of the next layer. This, however, may be unnecessary, since the same affect may be achieved by setting weights to 0 and biases to a large positive number for one of the units so that it always outputs 1.

With reference now collectively to FIGS. 7-9, exemplary variants of a DTNN architecture are illustrated. With reference solely to FIG. 7, an exemplary variant 700 of the deep tensor neural network in which linear activations 702 ($z_1^{l-1}$) and 704 ($z_2^{l-1}$) (e.g., which include no sigmoid nonlinearity), are directly connected to the hidden layer 208 through the tensor 312.

FIG. 8 illustrates an architecturally equivalent representation of the DTNN 700 shown in FIG. 7, where the weighted tensor 312 is converted into the weight matrix 312 by defining $$v^l = \text{vec}(z_1^{l-1} \otimes z_2^{l-1}) = \text{vec}(z_1^{l-1}(z_2^{l-1})^T), \quad (7)$$

shown as a hidden layer 802. It can be noted that the sole difference between the architectures shown in FIG. 7 and FIG. 8, and those shown in FIG. 3 and FIG. 4, respectively, is that the latter includes sigmoid nonlinearity before connecting to the next layer. This provides numerical stability and also incorporates the former as a special case if restricting the sigmoid function to the linear range.

FIG. 9 shows another variant 900 of the DTNN 300, in which linear projection layers are also used but $v^l$ is redefined as $$v^l = h^{l-1} = \sigma(\text{vec}(z_1^{l-1} \otimes z_2^{l-1})), \quad (8)$$

which is shown as layer 902.

A difference between this model and that illustrated in FIG. 3 and FIG. 4 is that the sigmoid nonlinearity is applied after the Kronecker product, instead of to the two individual parts of the projection layers. The architecture of FIG. 9, while also modeling the relations between two subspaces in their upper layer, is not strictly a DTNN, since it cannot be rewritten and represented using a tensor. Therefore, the architecture shown in FIG. 9 can be referred to as a quasi-DTNN.

Exemplary techniques for learning parameters (e.g., parameters associated with weight tensors and weight matrices) of a DTNN are now described. In an exemplary embodiment, DTNN parameters can be optimized by maximizing the cross entry $$D = \sum_x \tilde{p}(y|x) \log p(y|x) \quad (9)$$

commonly used for conventional DNNs, where $\tilde{p}(y|x)$ is a target distribution that is typically an empirical distribution observed from a training data set. The parameters can be learned, for instance, using the backpropagation algorithm.

The gradients associated with the softmax layer and the conventional sigmoid layers are similar to those in the conventional DNNs. Specifically, for the softmax layer these gradients are computed by:

$$\frac{\partial D}{\partial w^L} = v^L (e^L(x))^T, \quad (10)$$

$$\frac{\partial D}{\partial a^L} = e^L(x), \quad (11)$$

where $w^L$ is the $K_v^L \times C$ weighted matrix, $a^L$ is the $C \times 1$ bias column vector, and $e^L(x)$ is a $C \times 1$ error column vector with $$e_i^L(x) = (\tilde{p}(y=i|x) - p(y=i|x)), \quad (12)$$

where $\tilde{p}(y=i|x)$ is the empirical probability and $p(y=i|x)$ is a model predicted probability. For other layer with $l<L$, the error signal can be defined as $$e^l(x) = \frac{\partial D}{\partial v^{l+1}}.$$

In the softmax layer, the error can be propagated to the immediately previous layer according to the following:

$$e^{L-1}(x) = \frac{\partial D}{\partial v^L} = w^L e^L(x). \quad (13)$$

Similarly, for the conventional sigmoid layer, the following gradients can be obtained:

$$\frac{\partial D}{\partial w^l} = v^l (\text{diag}(\sigma'(z^l(v^l)))e^l(x))^T, \tag{14}$$

$$\frac{\partial D}{\partial a^l} = \text{diag}(\sigma'(z^l(v^l)))e^l(x), \tag{15}$$

and $$e^{l-1}(x) = \frac{\partial D}{\partial v^l} = w^l \text{diag}(\sigma'(z^l(v^l)))e^l(x), \tag{16}$$

where $\sigma'(x)=\sigma(x)(1-\sigma(x))$ is the gradient of the sigmoid function applied element-wise, and diag(.) is the diagonal matrix determined by the operant.

The gradients, however, as well as their derivations can be more complicated for projection layers, which are derived as shown below. It can be noted that for a projection layer, the following is obtained:

$$\begin{aligned} v^{l+1} &= \text{vec}(h_1^l (h_2^l)^T) \\ &= (h_2^l \otimes I_{K_1^l}) \text{vec}(h_1^l) = (h_2^l \otimes I_{K_1^l}) h_1^l \\ &= (I_{K_2^l} \otimes h_1^l) \text{vec}((h_2^l)^T) = (I_{K_2^l} \otimes h_1^l) h_2^l \end{aligned} \tag{17}$$

where $1_K$ is a K×K identity matrix. $v^{l+1}$ is thus a $(K_1^l \times K_2^l) \times 1$ column vector whose elements are $v_{(j+k \cdot K_1^l)}^l = h_{(1,j)}^l h_{(2,k)}^l$, where matrix and vector index is assumed to be 0-based. This leads to the following gradients:

$$\frac{\partial (v^{l+1})^T}{\partial h_1^l} = \frac{\partial ((h_2^l \otimes I_{K_1^l}) h_1^l)^T}{\partial h_1^l} = (h_2^l)^T \otimes I_{K_1^l}, \tag{18}$$

whose (i,j+k·$K_1^l$)-th element is $\delta(i=j)h_{2,k}^l$, and $$\frac{\partial (v^{l+1})^T}{\partial h_2^l} = \frac{\partial ((I_{K_2^l} \otimes h_1^l) h_2^l)^T}{\partial h_2^l} = I_{K_2^l} \otimes (h_1^l)^T, \tag{19}$$

whose (i,j+k·$K_1^l$)-th element is $\delta(i=k)h_{1,j}^l$.

It can be noted that for the portions $i \in \{1,2\}$, $$\frac{\partial (h_i^l)^T}{\partial \text{vec}(w_i^l)} = v^l \otimes \text{diag}(\sigma'(z_i^l(v^l))), \tag{20}$$

$$\frac{\partial (h_i^l)^T}{\partial a_i^l} = \text{diag}(\sigma'(z_i^l(v^l))), \tag{21}$$

and $$\frac{\partial (h_i^l)^T}{\partial v^l} = w_i^l \text{diag}(\sigma'(z_i^l(v^l))). \tag{22}$$

By defining $$e_i^l(x) = \frac{\partial D}{\partial h_i^l},$$

the following is obtained:

$$e_i^l(x) = \frac{\partial D}{\partial h_i^l} = \frac{\partial h^l}{\partial h_i^l} \frac{\partial D}{\partial h^l}. \tag{23}$$

More specifically, $$e_1^l(x) = ((h_2^l)^T \otimes I_{K_1^l})e^l(x) = [e^l(x)]_{K_1^l, K_2^l} h_2^l, \text{ and} \tag{24}$$

$$e_2^l(x) = (I_{K_2^l} \otimes (h_1^l)^T)e^l(x) = ([e^l(x)]_{K_1^l, K_2^l})^T h_1^l, \tag{25}$$

where $[e^l(x)]_{K_1^l, K_2^l}$ reshapes $e^l(x)$ to a $K_1^l \times K_2^l$ matrix. The gradients needed for the backpropagation algorithm in the projection layers are thus as follows:

$$\begin{aligned} \frac{\partial D}{\partial w_i^l} &= \left[\frac{\partial D}{\partial \text{vec}(w_i^l)}\right]_{K_v^l, K_i^l} \\ &= \left[\frac{\partial h_i^l}{\partial \text{vec}(w_i^l)} \frac{\partial D}{\partial h_i^l}\right]_{K_v^l, K_i^l} \\ &= [(v^l \otimes \text{diag}(\sigma'(z_i^l(v^l))))e_i^l(x)]_{K_v^l, K_i^l} \\ &= v^l (\text{diag}(\sigma'(z_i^l(v^l)))e_i^l(x))^T, \end{aligned} \tag{26}$$

$$\frac{\partial D}{\partial a_i^l} = \frac{\partial h_i^l}{\partial a_i^l} \frac{\partial D}{\partial h_i^l} = \text{diag}(\sigma'(z_i^l(v^l)))e_i^l(x) \tag{27}$$

and $$\begin{aligned} e^{l-1}(x) &= \frac{\partial D}{\partial v^l} \\ &= \sum_{j \in \{1,2\}} \frac{\partial h_j^l}{\partial v^l} \frac{\partial D}{\partial h_j^l} \\ &= \sum_{j \in \{1,2\}} \frac{\partial h_j^l}{\partial v^l} e_j^l(x) \\ &= \sum_{j \in \{1,2\}} w_j^l \text{diag}(\sigma'(z_j^l(v^l)))e_j^l(x). \end{aligned} \tag{28}$$

A learning algorithm that can be employed with respect to a quasi-DTNN, such as that shown in FIG. 9, is similar to that presented above. A difference is that for the projection layers in the quasi-DTNN, the gradients become as follows:

$$e_i^l(x) = e^l(x)\text{diag}(\sigma'(h^l))z_{1-i}^l(v^l), \tag{29}$$

$$\frac{\partial D}{\partial w_i^l} = v^l (e_i^l(x))^T, \tag{30}$$

$$\frac{\partial D}{\partial a_i^l} = e_i^l(x), \tag{31}$$

and $$e^{l-1}(x) = \sum_{j \in \{1,2\}} w_j^l e_j^l(x). \tag{32}$$

Figure 10:
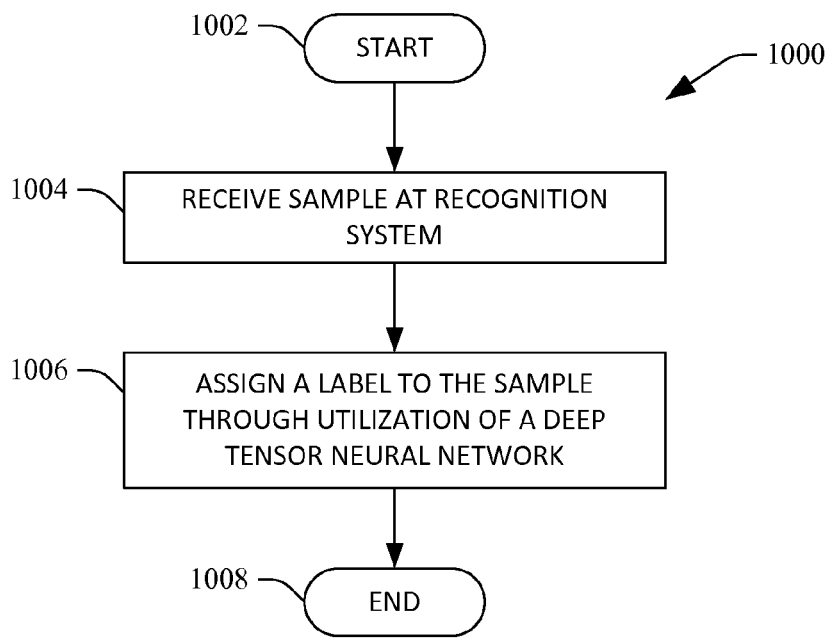
FIG. 10 is a flow diagram that illustrates an exemplary methodology for assigning a label to an input sample.
Figure 11:
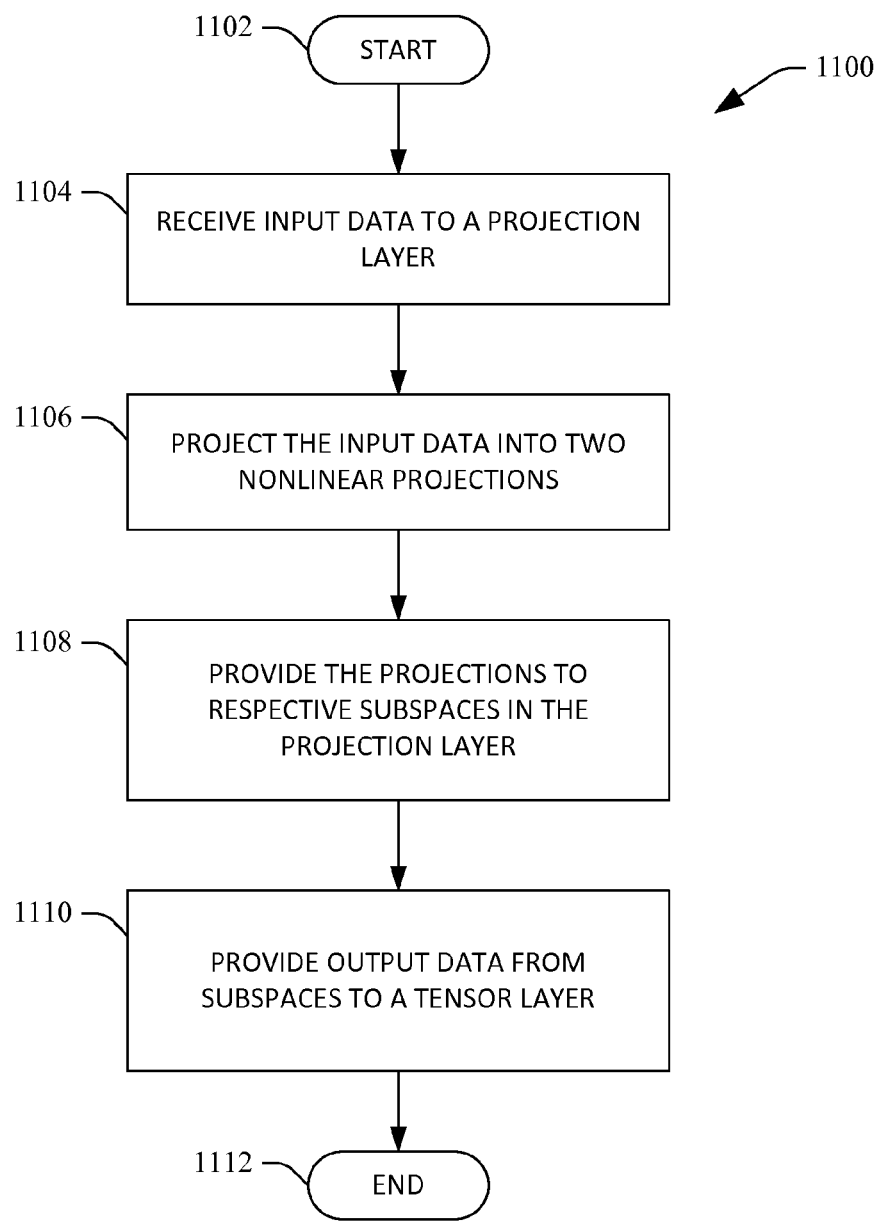
FIG. 11 is an exemplary flow diagram that illustrates an exemplary methodology for projecting an input vector into two subspaces in a DTNN and subsequently generating an output vector at a tensor layer in the DTNN based upon content of the subspaces.

With reference now to FIGS. 10 and 11, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Turning now solely to FIG. 10, an exemplary methodology 1000 that facilitates assigning a label to a sample provided by a user is illustrated. The methodology 1000 starts at 1002, and at 1004, the sample is received from a user at a computer implemented recognition system.

At 1006, a label is assigned to the sample through employment of a computer-implemented DTNN, wherein the DTNN comprises a plurality of stacked layers, and wherein the plurality of stacked layers comprise a plurality of hidden layers that include a projection layer and a tensor layer. The projection layer comprises a plurality of subspaces, wherein each subspace comprises a respective, potentially nonlinear, projection of input data to the projection layer. Therefore, a first subspace in the projection layer comprises a first projection of input data to the projection layer, a second subspace in the projection layer comprises a second projection of input data to the projection layer, and so on. The tensor layer is configured to receive projections from the respective subspaces, execute a mathematical operation over such projections to generate an output vector of values that maps to an immediately adjacent layer in the DTNN. The methodology 1000 completes at 1008.

Now referring to FIG. 11, an exemplary methodology 1100 that facilitates combining projections in a DTNN is illustrated. The methodology 1100 starts at 1102, and at 1104 input data to a projection layer is received (e.g., in the form of a vector). At 1106, the input data is projected into respective different projections, wherein such projections are nonlinear. At 1108, the different projections are provided to different respective subspaces of hidden units in the projection layer.

At 1110, output data from each of the subspaces in the projection layer is received at a tensor layer in the DTNN, and the output data is effectively combined for mapping to an immediately adjacent layer in the DTNN. The methodology 1100 completes at 1112.

Figure 12:
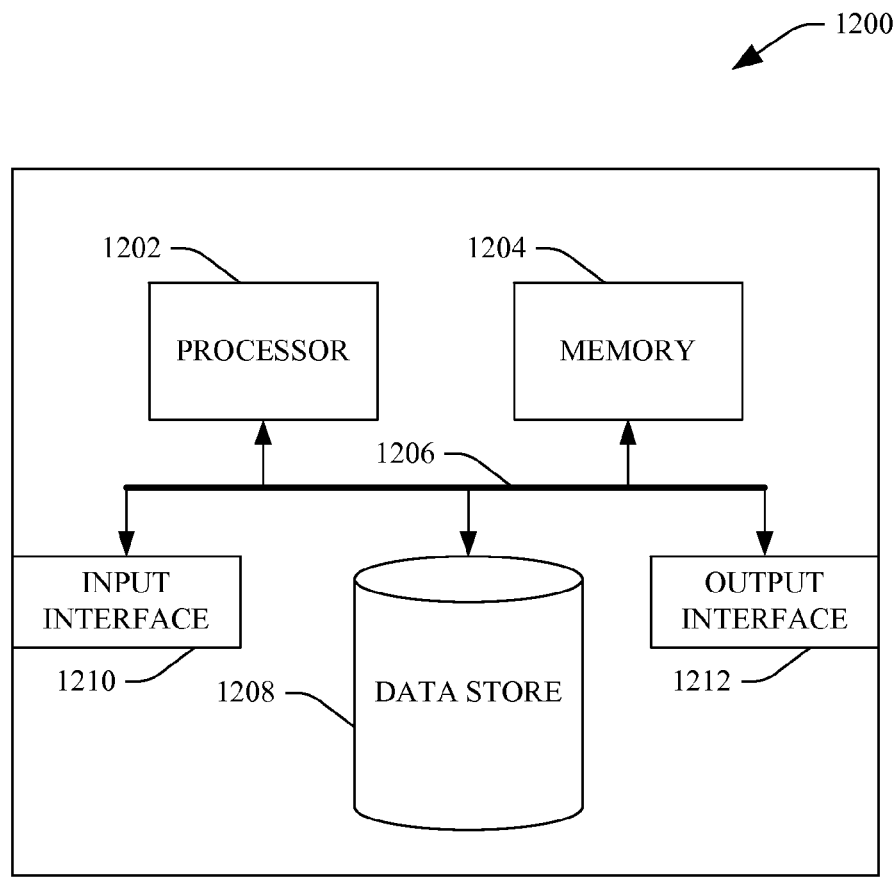
FIG. 12 is an exemplary computing system.

Now referring to FIG. 12, a high-level illustration of an exemplary computing device 1200 that can be used in accordance with the systems and methodologies disclosed herein is illustrated. For instance, the computing device 1200 may be used in a system that supports a computer-implemented recognition system. In another example, at least a portion of the computing device 1200 may be used in a system that supports learning parameters of a DTNN or a quasi-DTNN. The computing device 1200 includes at least one processor 1202 that executes instructions that are stored in a memory 1204. The memory 1204 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store training data, retained input samples, etc.

The computing device 1200 additionally includes a data store 1208 that is accessible by the processor 1202 by way of the system bus 1206. The data store may be or include any suitable computer-readable storage, including a hard disk, memory, etc. The data store 1208 may include executable instructions, training data, weights for synapses between layers in a DTNN, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    at a recognition system, receiving a sample; and
    assigning a label to the sample through employment of a computer-implemented deep tensor neural network, the deep tensor neural network comprising a plurality of layers, the plurality of layers comprising:
        a plurality of hidden layers that comprise a projection layer and a tensor layer, each hidden layer in the plurality of hidden layers at least one of:
        receives data output from another immediately adjacent hidden layer in the plurality of hidden layers; or
        outputs data to another immediately adjacent hidden layer in the plurality of hidden layers;
        the projection layer comprising a plurality of subspaces, each subspace in the plurality of subspaces comprising respective hidden units, and wherein each subspace is provided with a respective projection of input data from a first immediately adjacent layer in the deep tensor neural network, wherein projections provided to respective subspaces are nonlinear projections of the input data, and wherein the tensor layer receives respective output data from each subspace in the plurality of subspaces and generates an output vector for provision to a second immediately adjacent layer in the deep tensor neural network, the output vector being based at least in part upon the respective output data from subspaces in the projection layer.

2. The method of claim 1, wherein the second immediately adjacent layer is a second projection layer.

3. The method of claim 1, wherein a sigmoid function is applied to at least one projection of the input data.

4. The method of claim 1, wherein the sample is one of a voice sample or a handwriting sample.

5. The method of claim 1, wherein the plurality of hidden layers comprise a plurality of projection layers and a plurality of tensor layers.

6. The method of claim 1, further comprising learning weights between hidden layers in the deep neural network through backpropagation.

7. The method of claim 1, wherein the label assigned to the sample is one of a word, a phone, or a senone.

8. The method of claim 1, wherein the first immediately adjacent layer and the second immediately adjacent layer are hidden layers in the deep tensor neural network.

9. The method of claim 1, wherein the tensor layer is converted into a conventional layer by converting a weight tensor in the tensor layer to a weight matrix, the weight matrix defining the synapses' connection strengths between the projection layer and the second immediately adjacent layer in the deep tensor neural network.

10. The method of claim 1 configured for execution in a mobile computing device.

11. The method of claim 10, wherein the mobile computing device is one of a mobile telephone or a tablet computing device.

12. A computing apparatus, comprising:
at least one processor; and
memory storing instructions that, when executed by the at least one processor, cause the at least one processor to perform acts comprising:
receiving a sample from a user;
providing the sample to an input layer of a deep tensor neural network, the deep tensor neural network comprises a plurality of hidden layers, wherein a hidden layer in the plurality of hidden layers receives data output by another immediately adjacent hidden layer in the plurality of hidden layers, the plurality of hidden layers comprising a plurality of projection layers and a plurality of tensor layers, wherein each projection layer comprises at least two subspaces of hidden units that are provided with respective nonlinear projections of input data received from a first immediately adjacent layer in the deep tensor neural network, and wherein each tensor layer receives respective output data from each subspace in an immediately adjacent projection layer and generates a respective output vector for receipt at a second immediately adjacent layer in the deep tensor neural network based at least in part upon the output data received from each of the subspaces; and
assigning a label to the sample based upon the output data received from each of the subspaces.

13. The computing apparatus of claim 12 being a mobile computing device.

14. The computing apparatus of claim 13, wherein the mobile computing device is one of a mobile telephone or a tablet computing device.

15. The computing apparatus of claim 12, wherein a sigmoid function is employed to generate at least one nonlinear projection in the nonlinear projections.

16. The computing apparatus of claim 12, wherein the sample is an utterance spoken by the user, and wherein the label is indicative of at least one word in the spoken utterance.

17. The computing apparatus of claim 12, wherein the respective projections are provided to the respective subspaces based at least in part upon respective sets of weighted synapses.

18. The computing apparatus of claim 12, wherein weights of parameters of the deep tensor neural network are learned by way of a backpropagation algorithm.

19. A computer-readable hardware storage device comprising instructions that, when executed by a processor, cause the processor to perform acts comprising:
receiving, by way of a microphone, a spoken utterance from an individual; and
utilizing a deep tensor neural network to assign a label to at least a portion of the spoken utterance, the label being indicative of at least one word in the spoken utterance, and wherein the deep neural network comprises a plurality of hidden layers, wherein a hidden layer in the plurality of hidden layers outputs data that is received by another immediately adjacent hidden layer in the plurality of hidden layers, the plurality of hidden layers comprising a plurality of projection layers and a plurality of tensor layers, wherein each projection layer is coupled to a respective tensor layer, wherein each projection layer comprises at least two subspaces of hidden units that are provided with respective nonlinear projections of input data received from a first immediately adjacent layer in the deep tensor neural network, and wherein each tensor layer maps at least two output vectors generated by the at least two subspaces of hidden units into output data for provision to a second immediately adjacent layer in the deep tensor neural network.

20. The computer-readable hardware storage device of claim 19, wherein the label assigned to the spoken utterance is a disambiguated word in the spoken utterance.

* * * * *